United States Patent [19]

Legal

[11] Patent Number: 5,236,055
[45] Date of Patent: Aug. 17, 1993

[54] WHEEL WITH COAXIAL DRIVE SYSTEM MOUNTED IN THE WHEELHUB FIELD OF THE INVENTION

[75] Inventor: Jules O. Legal, Manitoba, Canada

[73] Assignee: Canadian Aging & Rehabilitation Product Development Corporation, Winnipeg, Canada

[21] Appl. No.: 728,713

[22] Filed: Jul. 11, 1991

Related U.S. Application Data

[63] Continuation-in-part of Ser. No. 668,866, Mar. 13, 1991, Pat. No. 5,183,133.

[51] Int. Cl.$^5$ ............................................. B60K 1/00
[52] U.S. Cl. .................................. 180/65.5; 180/65.6; 180/907; 310/67 R
[58] Field of Search ............... 180/65.5, 65.6, 252, 180/10, 22, 6.5, 214, 907; 310/67 R

[56] References Cited

U.S. PATENT DOCUMENTS

| | | | |
|---|---|---|---|
| 641,603 | 1/1900 | Newman et al. | 310/67 R |
| 680,804 | 8/1901 | Newman et al. | 310/67 R |
| 1,090,684 | 3/1914 | Church | 310/67 R |
| 1,172,456 | 2/1916 | Hoadley | 310/67 R |
| 2,608,598 | 8/1952 | Hawkins et al. | 180/10 |
| 3,163,250 | 12/1964 | Gibson | 180/65.5 |
| 3,370,668 | 2/1968 | Goodacre | 180/65.5 |
| 3,387,681 | 6/1968 | Rabjohn | 180/13 |
| 3,477,547 | 11/1969 | Kress et al. | 180/65.6 |
| 3,802,524 | 4/1974 | Seidel | 180/6.5 |
| 4,021,690 | 5/1977 | Burton | 310/67 R |
| 4,389,586 | 6/1983 | Foster et al. | 310/67 R |
| 4,403,673 | 9/1983 | Ball | 180/214 |
| 4,406,340 | 9/1983 | Gennaux | 180/65.5 |
| 4,475,613 | 10/1984 | Walker | 180/22 |
| 4,513,832 | 4/1985 | Engman | 180/6.5 |
| 4,799,564 | 1/1989 | Iijima et al. | 180/65.6 |
| 4,887,826 | 12/1989 | Kantner | 280/250.1 |
| 4,930,590 | 6/1990 | Love et al. | 180/65.5 |

FOREIGN PATENT DOCUMENTS

| | | |
|---|---|---|
| 920950 | 12/1954 | Fed. Rep. of Germany . |
| 2231207 | 3/1973 | Fed. Rep. of Germany . |
| 3826933 | 2/1990 | Fed. Rep. of Germany . |
| WO91/01897 | 6/1990 | PCT Int'l Appl. . |
| 2123362 | 2/1984 | United Kingdom . |

Primary Examiner—Margaret A. Focarino
Assistant Examiner—Kevin Hurley
Attorney, Agent, or Firm—Adrian D. Battison; Stanley G. Ade; Murray E. Thrift

[57] ABSTRACT

A motorized wheel assembly is provided for a wheelchair in which there is a seat for receiving the occupant attached to a vertical shaft with a single central wheel mounted at the bottom of the shaft for rotation about a horizontal axis transverse to the chair and defining a direction of forward movement of the wheel forwardly of the chair. On the shaft is carried a battery and control unit for supplying power to the drive motor of the, wheel mounted on the hub of the wheel. An outrigger frame includes a sleeve slidable on the shaft and a plurality of arms extending outwardly from the sleeve each arm carrying a castor wheel to prevent toppling of the device. Steering is achieved by the feet of the user applied to the outrigger frame to rotate the chair and the drivewheel about a vertical axis. The wheel is of the motor in a hub design which is achieved by providing a cylindrical housing surrounding the motor with at least one annular bearing on the outer peripheral surface of the housing carrying the rim of the wheel which directly surrounds the housing. An output shaft at one end of the housing drives the rim through a coupling extending around the housing.

11 Claims, 5 Drawing Sheets

WHEEL WITH COAXIAL DRIVE SYSTEM MOUNTED IN THE WHEELHUB FIELD OF THE INVENTION

This is a continuation-in-part of application, Ser. No: 668,866, filed Mar. 13th, 1991 and now issued as U.S. Pat. No. 5,183,133.

The present invention relates to a drive wheel assembly with a coaxial drive system at least partly mounted within a hub of the wheel.

BACKGROUND OF THE INVENTION

Many different types of vehicles require a drive system which provides power to one or more of the wheels of the vehicle. Such vehicles designed for slow relatively low power usage such as chairs for handicapped persons often include a motor directly driving one of the wheels provided with power from a battery.

One of the problems of such chair designs is the unsatisfactory nature of the wheel and motor construction which is extremely bulky and thus complicates the construction of the device and reduces the area available for storage of the battery or other equipment. Attempts have been made to design an arrangement in which the motor for driving the wheel is positioned within the hub of the wheel since this can provide a very compact arrangement particularly suitable for the design of a motorized chair. However a motor-in-the-hub design can also be used in other designs of motorized vehicles with significant advantages of compactness and ease of operation.

Some designs have already been proposed for motor-in-the-hub wheel drive arrangements but these are highly complicated and therefore very costly to manufacture and it is believed that none is commercially successful or has been manufactured on a commercial scale. various proposals are shown in all U.S. Pat. No. 641,603 (Newman); 680,804 (Newman); 1,090,684 (Church); 1,172,456 (Hoadley); 2,608,598 (hawkins and more recent U.S. Pat. No. 4,021,690 (Burton). However, as stated above all these devices are highly complicated leading to devices which cannot be manufactured on a commercial scale.

SUMMARY OF THE INVENTION

It is one object of the present invention, therefore, to provide an improved driven wheel asesmbly.

According to the invention, therefore, there is provided a driven wheel assembly for providing motive power to an article to which the wheel is attached, the wheel assembly comprising a wheel peripheral member for engaging the ground, a wheel rim on which the peripheral member is mounted for rotation about an axis of the wheel rim, a motor and transmission assembly for driving the wheel, housing means within which the motor and transmission assembly is mounted, the motor having an output member, means for communicating drive from the output member to the wheel rim for driving the peripheral member relative to the ground, at least a portion of the wheel rim coaxially surrounding a portion of the housing means, and bearing means for supporting the wheel rim for rotation relative to the housing means, the bearing means including an annular bearing positioned between the portion of the rim and the portion of the housing means.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different FIGURES.

DETAILED DESCRIPTION

Figure 1:
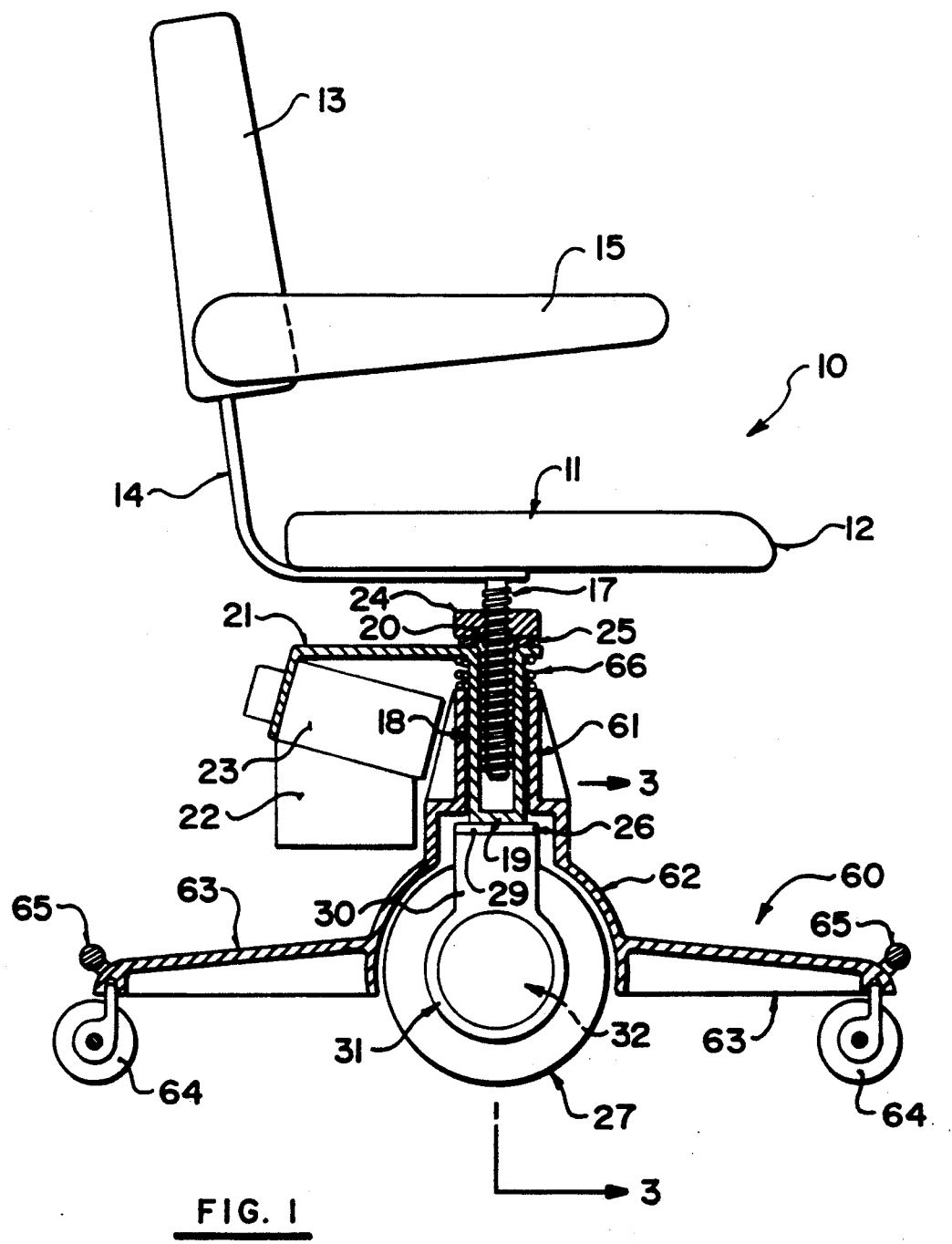
FIG. 1 is a cross sectional view taken along a vertical symmetrical plane of a motorized chair of a type showing one example for which the driven assembly of the present invention is particularly suitable.
Figure 2:
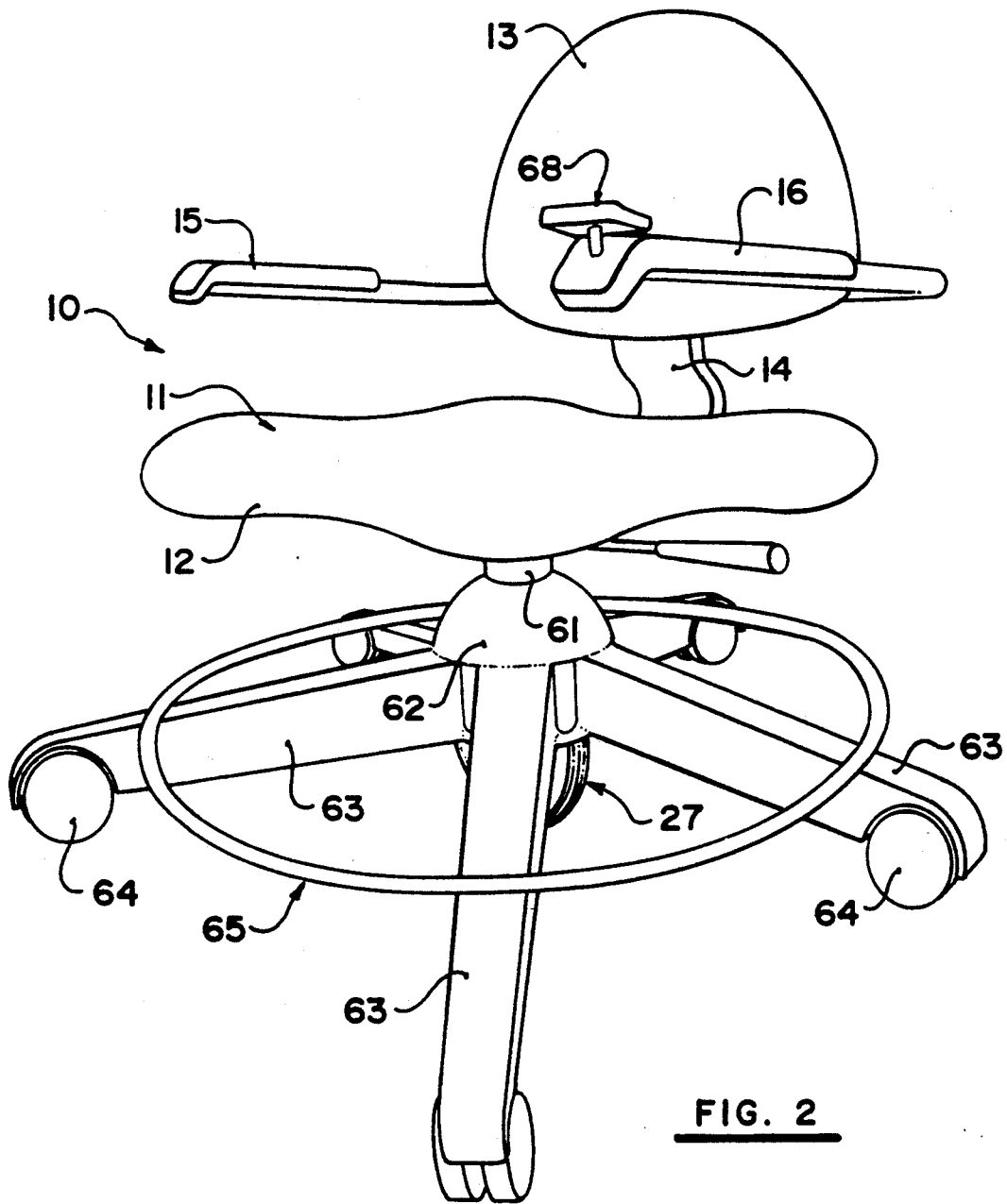
FIG. 2 is a perspective view of the chair of FIG. 2.
Figure 3:
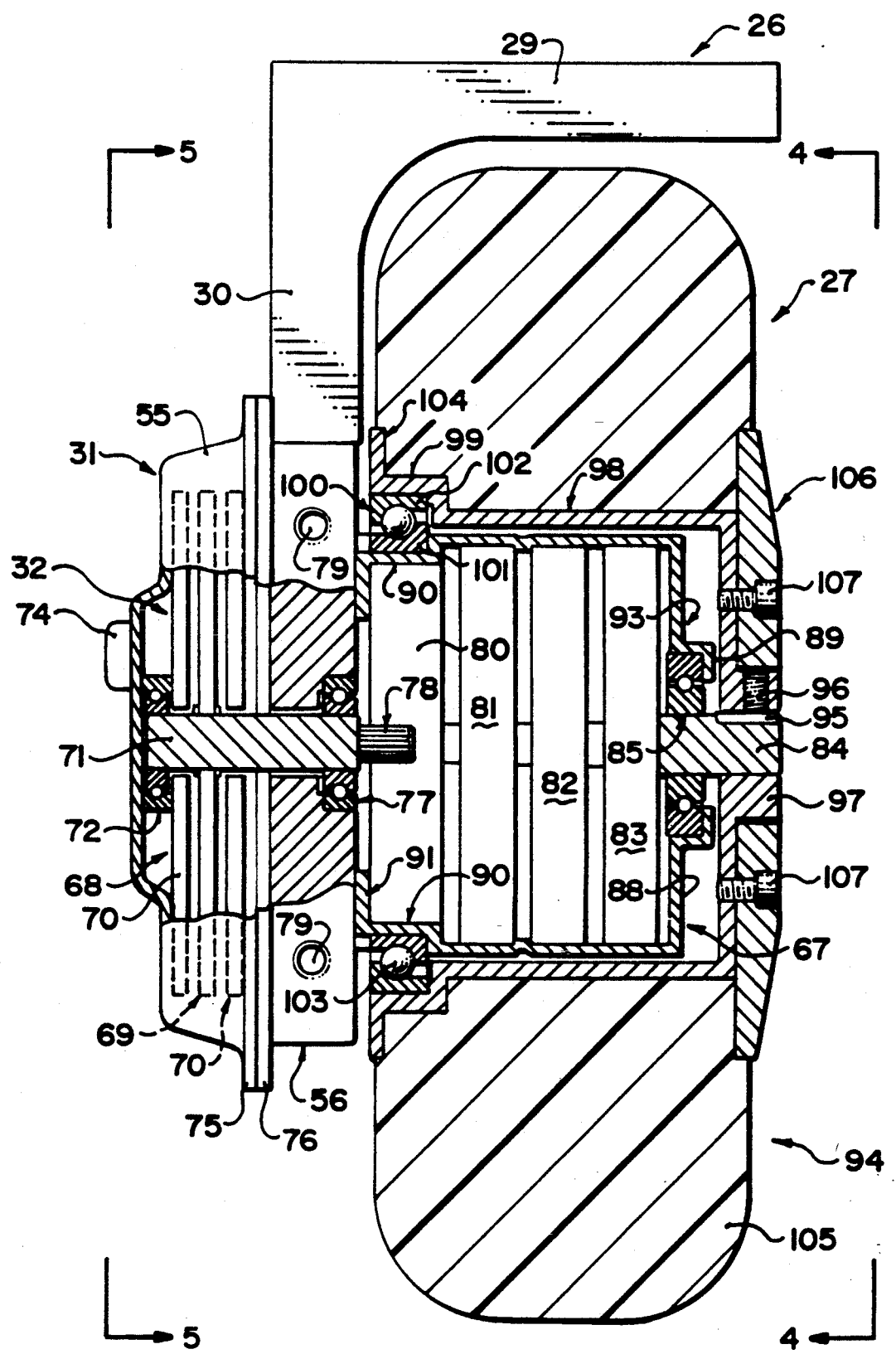
FIG. 3 is a cross sectional view taken along the lines 3—3 of FIG. 1 showing the motor, gear box and clutch arrangement of a driven wheel assembly according to the invention.
Figure 4:
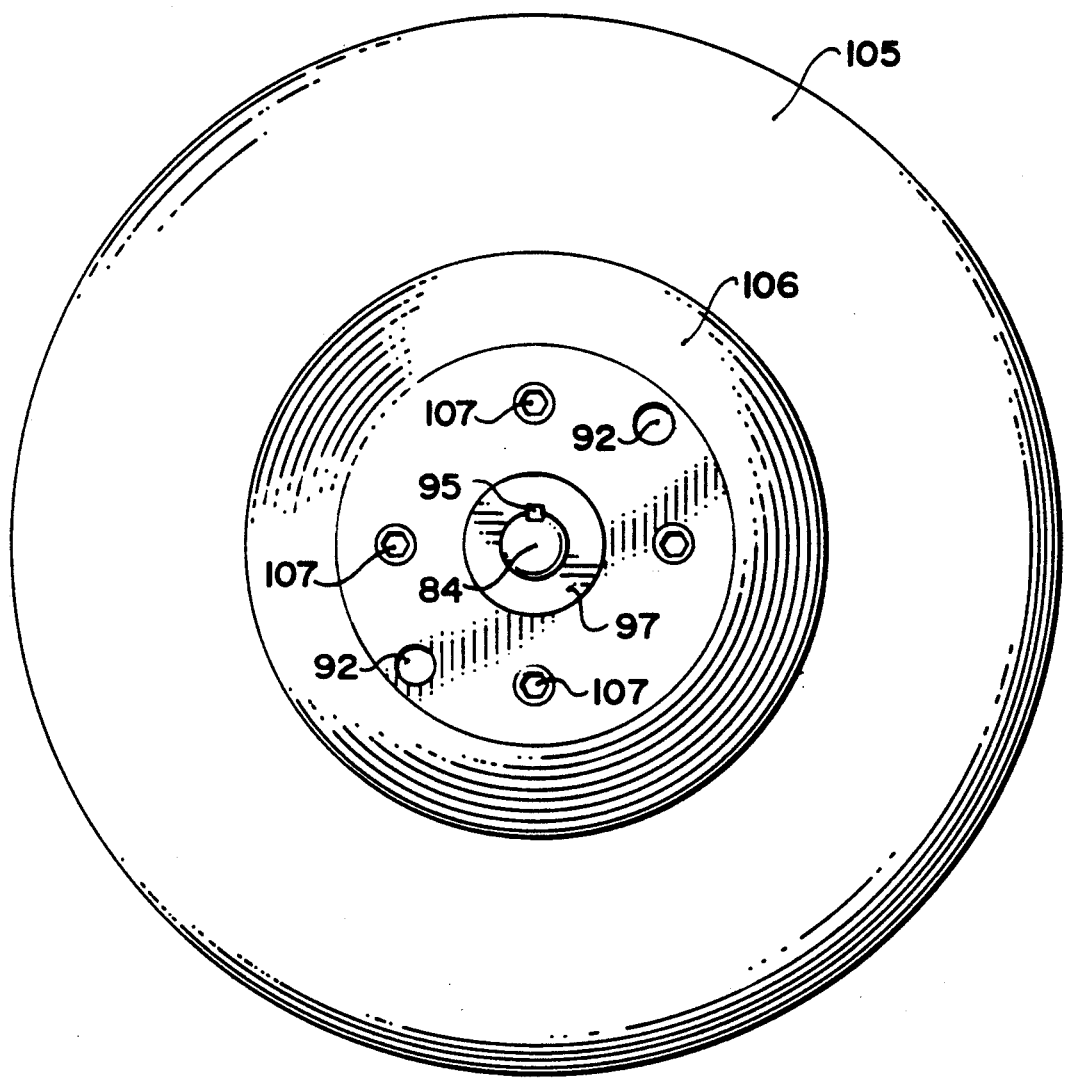
FIG. 4 is a view along the lines 4—4 of FIG. 3.
Figure 5:
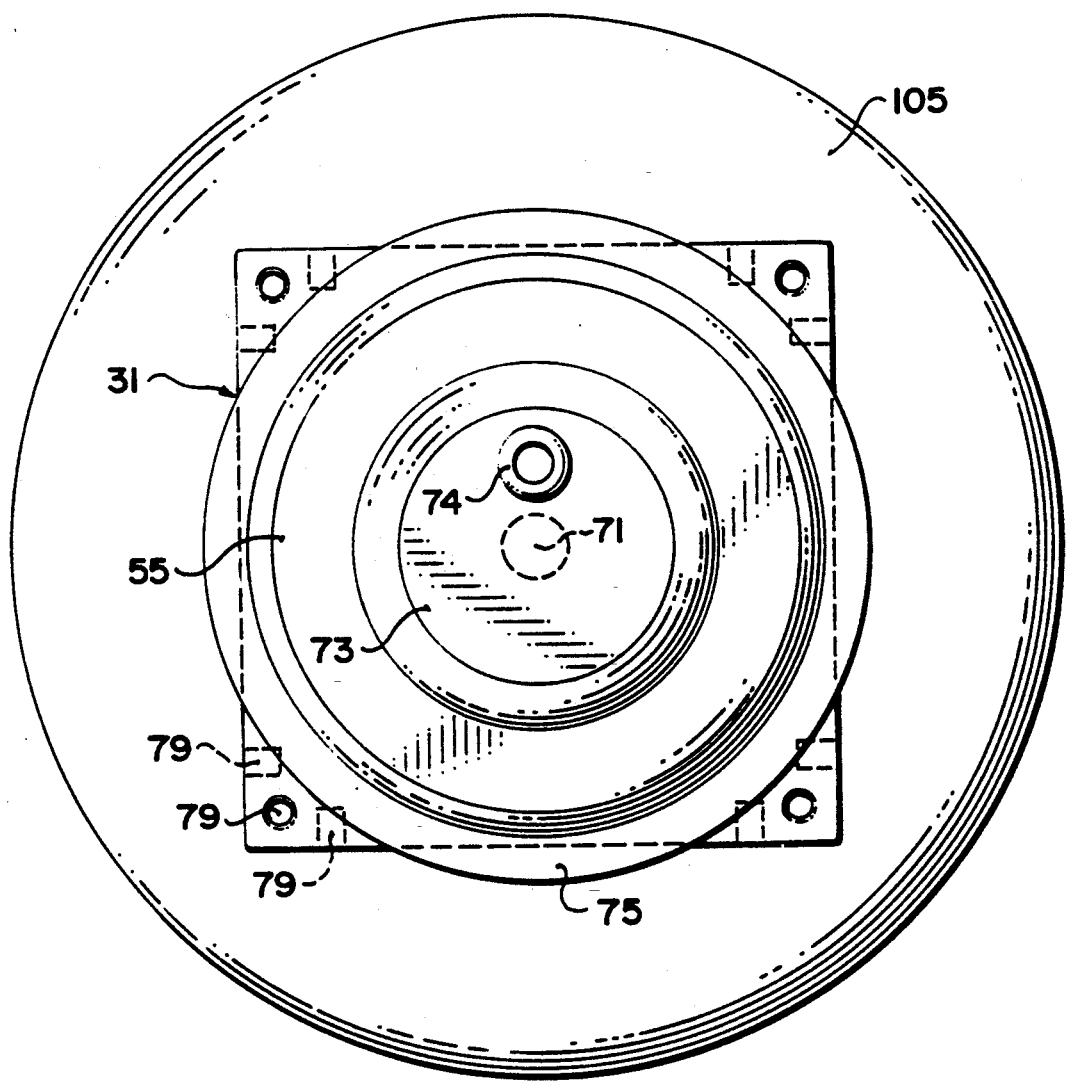
FIG. 5 is a view along the lines 5—5 of FIG. 3.

The drive wheel assembly shown in FIGS. 3, 4 and 5 can be used with various designs of vehicle, one example of which is shown in FIGS. 1 and 2.

The chair shown in FIGS. 1 and 2 comprises a seat element generally indicated at 10 including a horizontal seat bottom 11 onto which the occupant can sit so as to be supported by the seat bottom 11 with the posterior of the occupant at the rear of the seat bottom and the legs of the occupant depending over a front edge 12 of the seat bottom. At the rear of the seat bottom is mounted a seat back 13 carried on a suitable vertical support 14 with arms 15 and 16 connected to the seat back 13 and extending from the sides of the seat back forwardly along the sides of the seat bottom in conventional manner. The occupant can therefore simply enter the seat element by backing onto the seat and sitting onto the seat in the conventional manner without any further difficulties.

The seat element 10 is mounted upon a vertical shaft 17 coupled to the underside of the seat bottom in conventional manner to provide sufficient strength to accomodate the weight of the occupant without breaking or significant flexing. The shaft 17 carries an external screw thread. The shaft is threadably engaged into a cup 18 in the form of a cylindrical body having a closed lower end 19. The cup 18 carries, at an open upper end 20, a plate 21 which closely surrounds the shaft and which projects outwardly from one side of the shaft to act as a support element for a battery pack 22 and a control unit 23 both of which are shown only schematically. The cup 18 and the plate 21 are thus effectively integral. The cup is clamped to the threaded shaft 17 by a nut 24 which can be screwed down to clamp a washer 25 against the upper surface of the plate 21 thus holding the seat element, the shaft, the plate, the battery and the control unit as an integral item for a common rotation about the vertical axis of the shaft. The closed lower end 19 of the cup 18 is attached to a bracket 26 carrying a first wheel 27.

The bracket 26 includes a horizontal upper plate 29 which couples to a vertical plate 30 extending downwardly from one side of the plate 29. The plate 30 as shown in FIG. 1 is bolted to a housing assembly 31 of a drive motor and gear box generally indicated at 32.

As shown in FIG. 1, the main load of the seat and the occupant of the seat is applied downwardly through the shaft into the housing and into the wheel 27 for support of the occupant from the ground.

In order to prevent toppling of the seat on the central wheel 27 there is provided an outrigger frame generally indicated at 60. The outrigger frame includes a sleeve 61 surrounding the cup 18 and slidable relative thereto in both the longitudinal and angular direction to allow rotation of the outrigger frame relative to the shaft and vertical movement of the outrigger frame relative to the shaft and vertical movement of the outrigger frame relative to the shaft and vertical movement of the outrigger frame relative to the central wheel 27. The sleeve is coupled at its lower end to a dome section 62 which extends over the wheel 27 and the bracket 26. The dome can be simply and conveniently shaped and take little space at the centre of the chair as shown in FIG. 2 in view of the compact design of the motor and wheel arrangement.

Attached to the lower part of the dome are four arms 63 which project outwardly from the dome at angularly spaced positions around the periphery. The arms are cantilevered from the dome. Each arm carries at its outer end a freely rotatable wheel 64 which is non driven and roll simply across the ground. Three of the wheels are castor wheels so that they can rotate to take up any required direction about a vertical castor shaft (not shown). The fourth of the wheels is fixed so its direction of forward movement lies along the length of the respective arm. A circular hoop 65 is connected to the arms at a position spaced outwardly from the dome 62 so as to provide a convenient footrest for the feet of the occupant.

Between the underside of the plate 21 and the top of the sleeve 61 is provided a spring 66 acting as a compression spring pushing the sleeve 61 downwardly relative to the shaft 18. The spring action causes the outrigger frame to be pressed downwardly toward the ground and the seat and wheel 27 to be drawn upwardly into the dome. In a position of the device in which the seat is unoccupied, therefore, the wheel 27 is lifted to a height above the lowermost edge of the wheels 64 so that only the wheels 64 rest upon the ground except when the seat is occupied.

In operation the occupant can simply enter the chair by the conventional manner stepping backwards and seating on the seat bottom. The feet of the occupant can then be lifted onto the outrigger frame and particularly the hoop 65. A control unit 68 is positioned on one of the arms of the chair for actuating the supply of power from the battery 22 through the control unit 23 to the motor 32. The occupant can therefore simply supply power to the motor to drive the central wheel 27. The weight of the occupant presses the wheel 27 downwardly and applies a significant downward force onto the wheel so that it engages the ground with friction to provide drive in the forward direction of the wheel. As described above, the forward direction of the central wheel lies directly forwardly of the chair. However the chair can be rotated relative to the ground by the occupant simply pushing on the outrigger frame with a relatively gentle force so that the outrigger frame remains at a particular orientation to the ground but the chair and the drive wheel rotate relative to the ground in order for the outrigger frame to steer the chair. This allows the chair basically to rotate about its own centre.

The mounting of the battery, control unit, motor, wheel and seat all on the same integral support structure ensures that the device can fully rotate and there is no connection other than the bearing connection between the outrigger and the central support structure of the chair. There is therefore no restriction on the amount of rotation in one direction which can occur. The retraction of the central wheel into the dome ensures that when the occupant is removed, the device can simply be wheeled across the floor on the castor wheels.

The housing 31 includes a first housing portion 55, an attachment member 56 and a second housing portion 67. The first housing portion 55 houses a motor generally indicated at 68. The motor is shown only schematically but comprises a rotor disc 69 mounted between two staters 70 thus providing a motor which has a very thin axial length of the order of 0.75 to 1.0 inch and a diameter which is very much greater than the axial length and can in one example be of the order of 4 to 5 inches. Motors of this type are commercially available and hence the details of the rotor and stator will not be described as it will be apparent to one skilled in the art. The stator elements are mounted on the housing 55. The rotor is carried upon a motor shaft 71. The shaft is carried in the first bearing 72 mounted in a dome portion 73 of the housing 65 projecting axially out from an otherwise flat end face of the housing 65. A wire bushing 74 is provided on the end face of the dome 73 to allow the entry of the coupling wires for communication of drive power to the stator 70 of the motor.

A second end face of the housing portion 65 is defined by a flange 75 which projects radially outwardly from the housing so as to surround the housing and form a coupling flange for connection to the connecting member 56. The connecting member 56 thus includes a cooperating flange 76 coextensive with the flange 75 to which it is attached by suitable bolts. The coupling member 56 comprises a structurally rigid body to provide the structural strength to carry the motor on one side an to carry the gear box housing 67 on the other side. The connecting member 56 is square in front elevation as best shown in FIG. 5. The square block thus formed carries a bearing 77 for the shaft 71 so that a splined end 78 of the shaft can project outwardly from the connecting member 56 connection into the gear box section to be described hereinafter.

The connecting member 56 is designed for universal coupling in that it includes a plurality of blind tapped holes 79 arranged in different planes so as to allow coupling from different directions. Thus as shown in FIG. 3, each face of the rectangular block includes a pair of holes 79 along a centre line and spaced outwardly toward the outer edges. In addition each side face of the block defined in the connecting member 66 includes a further hole 79 which projects axially as best shown in FIG. 5. This allows the connecting member to be coupled to suitable supports for example the support bracket 30 by different bracket arrangements.

The housing portion 67 houses a gear reduction transmission system including a first gear assembly 80, a second gear assembly 81 and a third gear assembly 82 each providing gear reduction so that the total ratio of reduction is relatively high allowing the motor to rotate at high speed while the wheel is driven at relatively low speed. The gears are not shown in detail as these will be apparent to one skilled in the art. The gear assemblies are mounted on the inside surface of the housing 67 and each coupled to the next by a shaft section. The housing 67 further contains a clutch/brake assembly 83 which again is not shown in detail as this will be well known to one skilled in the art. The clutch includes a pair of clutch plates operable electrically to allow free wheeling of the system when required. The clutch/brake 83 further includes a brake assembly for connection of the wheel to the housing to act as a brake if required to halt the vehicle on which the wheel is mounted. The output from the clutch/brake 83 comprises a shaft 84 which projects out from an end face of the housing 67. The shaft 84 is mounted on bearings 85 carried on the end face of the housing 67 which is indicated at 88 and includes a recess 89 for receiving the bearings 85.

The housing 67 includes a cylindrical portion extending from the end plate 88 to a position closely adjacent the connecting member 56. A recess section 90 is formed adjacent the coupling member 56 and a flange 91 is defined at the end of the recess section with a flange projecting radially inwardly for clamping to the outer face of the connecting member 56. The flange 91 is clamped to the connecting member by bolts (not shown) which extend through the flange and into blind holes provides in the connecting member. The bolts can be accessed through openings defined in the housing extending through the end plate 88 and visible through the end parts of the wheel described hereinafter so the openings are shown in FIG. 4 at 92. This allows the assembly and disassembly of the gear box by inserting a tool through the openings 92 to engage the bolts and thus remove the gear box.

The shaft 84 projects outwardly from the end plate 88 a sufficient distance for connection to an end disc 93 of the wheel assembly 94. Thus the shaft includes a keyway 95 for receiving a set screw 96 passing through a boss 97 on the disc 93. The boss thus projects axially beyond the disc so that the set screw can be accessed and screwed radially inwardly and outwardly to engage the shaft. The disc 93 simply forms a flat disc which is integrally connected to a rim 98 of the wheel assembly. The rim defines an annular sleeve projecting axially from the outermost edge of the disc coaxially of the shaft 84. The rim 98 closely surrounds the cylindrical outer wall of the housing portion 67. The rim 98 the housing 67 so as to receive therebetween an annular bearing 100. The annular bearing thus includes an annular inner race 101, an annular outer race 102 surrounding the inner race and a plurality of rollers or balls 103 therebetween. The annular bearing 100 is positioned at the end of the cylindrical rim remote from the shaft 84 so that the bearings 100 and the bearings 85 provide sufficient support for rotation of the rim about the axis of the shaft 84 on those bearings. The inner race 101 is carried on the recess portion as a friction fit thereon. The outer race is carried on the recess portion 99 as a friction fit thereon.

At the edge of the recess portion 99 adjacent the connecting member 56 is provided an end flange 104 which surrounds the rim and extends radially outwardly therefrom for combining an edge of a tire 105 for engaging the ground and carried upon the rim. The tire is clamped in place on the rim by an end cap 106 in the form of a simple flat disc lying in contact with the disc 93 and clamped thereto by bolts 107. The end plate 106 projects radially outwardly beyond the cylindrical periphery of the rim so as to engage the edge of the tire and to clamp the tire between the flange 104 and the disc 106 so that it is held in place and prevented from rotating relative to the rim.

Preferably the tire is of a type formed by molding in solid form from a self skinning foam plastics material so that the tire is solid and can be molded into the required shape including the recesses for receiving the flange 104, the recess section 99 and the disc 106.

The design by which the housing including the motor, gear transmission and clutch is located at least partly within the hub of the wheel is particularly effective in confined spaces and allows designs of vehicles which avoid inefficient use of space in the area around the drive system and the wheels.

In some embodiments (not shown) the clutch can be omitted thus reducing the size of the gearbox section. In addition a brake, if needed, can be applied to the motor armature since this allows the brake to be smaller and locates it on the end of the motor outside the gear box section.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A driven wheel assembly for providing motive power to an article to which the wheel is attached, the wheel assembly comprising a wheel tire for engaging the ground, a wheel rim on which the tire is mounted for rotation about an axis of the wheel rim, a motor and transmission assembly for driving the wheel, housing means including a substantially cylindrical portion and an end face within which the motor and transmission assembly is mounted, the motor and transmission assembly having an output member extending through the end face, rigid drive connection means for communicating drive from the output member to the wheel rim for driving the tire relative to the ground, a sleeve shaped portion of the wheel rim coaxially surrounding the substantially cylindrical portion of the housing means, and bearing means for supporting the wheel rim the drive connection means and the output member as a single unit for rotation relative to the housing means, wherein the bearing means consists solely of an annular bearing positioned between the cylindrical portion of the rim and the sleeve shaped portion of the housing means and a second bearing smaller in diameter than the annular bearing located between the output member and the housing means, and wherein the tire is mounted directly upon and in contact with the sleeve shaped portion of the wheel rim.

2. The wheel assembly according to claim 1 wherein the housing means projects axially outwardly from one end of the rim.

3. The wheel assembly according to claim 1 wherein the housing means contains said motor, a reduction gear coupling mounted on an end of the motor and a clutch member connected between the gear coupling and the output member.

4. The wheel assembly according to claim 3 wherein the motor is mounted in a portion of the housing means projecting outwardly from the rim at said one end.

5. The wheel assembly according to claim 4 wherein a portion of the housing means surrounding the motor is of larger diameter than the portion projecting into the rim.

6. The wheel assembly according to claim 5 wherein the portion projecting into the rim receives the reduction gear coupling and the clutch member.

7. The wheel assembly according to claim 6 wherein the connecting means is mounted between the motor and said portion extending into the rim.

8. The wheel assembly according to claim 1 wherein the annular bearing is located at an end of the rim remote from the output member and wherein the output member comprises a shaft coaxial with the rim and wherein the second bearing is located inside the housing means between the housing means and the shaft.

9. The wheel assembly according to claim 1 wherein said drive connection means comprises a disc formed integrally with the sleeve shaped portion, the disc including an inner clamping portion for closely surrounding and clamping the drive shaft and wherein there is provided an end cap member clamped to the disc and extending radially outwardly form the disc to a radial extent greater than that of the sleeve shaped portion so as to clamp the ground engaging member between an end rim of the sleeve and the end cap member.

10. The wheel assembly according to claim 9 wherein the sleeve shaped portion includes a portion thereof of greater diameter than a first portion thereof adjacent the end cap and arranged to receive the annular bearing radially inwardly thereof.

11. The wheel assembly according to claim 1 wherein the tire is moulded from a self skinning foam material.

* * * * *